Jan. 17, 1961  A. E. KLOUDA  2,968,494
HITCH DEVICE
Filed Feb. 24, 1958
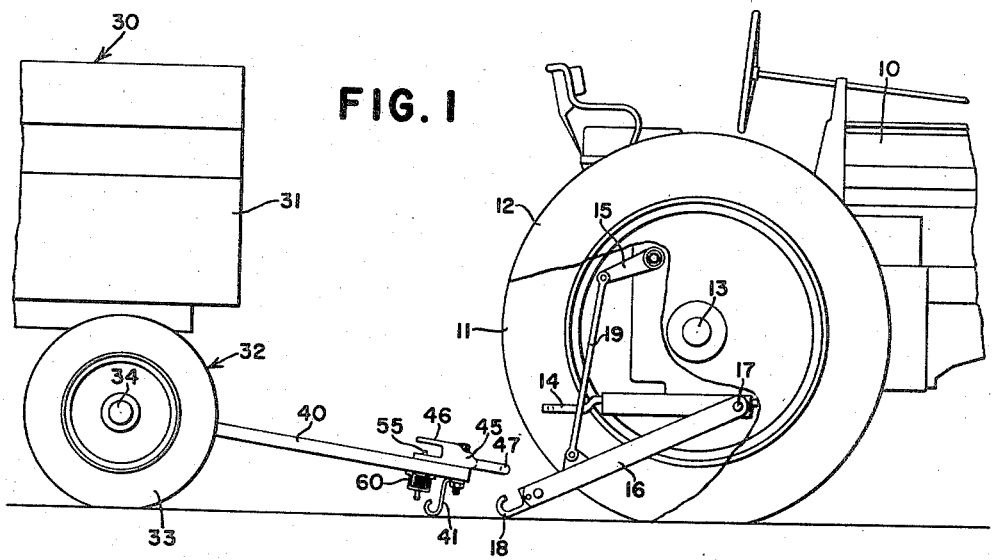
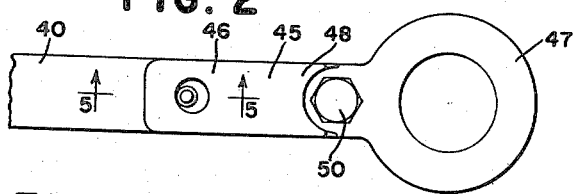
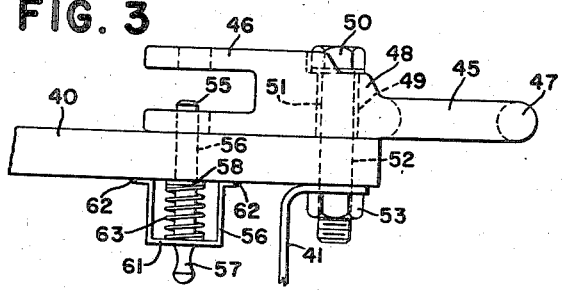
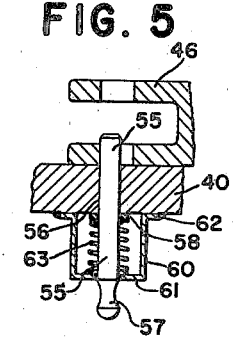
INVENTOR.
A. E. KLOUDA
BY
ATTORNEYS United States Patent Office 2,968,494
Patented Jan. 17, 1961

2,968,494
HITCH DEVICE

Alvin E. Klouda, Ames, Iowa, assignor, by mesne assignments, to Deere & Company, a corporation of Delaware Filed Feb. 24, 1958, Ser. No. 717,108
2 Claims. (Cl. 280—415)

This invention relates to a hitch device used to connect the forward end of a drawn vehicle to a tractor or other type of draft vehicle.

In many of the present day tractors there is provided an attachment for hitching the tractor to a drawn implement comprising a hook mounted on the end of a tractor mounted and vertically swingable drawbar which may move into and out of engagement with a ring on the forward end of the implement. In many instances, part of the load on the implement rests on its forward end and consequently the implement offers considerable resistance against being raised. Therefore, the purpose of the vertically swinging drawbar is to utilize the power lift system of the tractor for raising the forward end of the implement.

As mentioned, normally the vertical swinging drawbar is merely an attachment and as such does not exist on every tractor. Therefore, it is obviously expedient that there be provided on the forward end of the implement, a conventional clevis type connection which is connectible to the conventional drawbar provided on a tractor as well as the ring-type connection used in conjunction with the vertically swingable drawbar.

It is the main object of the present invention to provide a hitch assembly, a portion of which is mounted on the tractor and includes the vertically swingable drawbar and its associated adjusting means, and a portion of which is attachable to the forward end of the implement and features an elongated hitch element laterally swingable about a vertical pivot at the forward end of a draft arm on the implement and which has a ring at one end adapted to be connected to a hook and a clevis-type connection at the opposite end adapted to be connected to the conventional-type drawbar on the tractor. The hitch element is so connected to the draft arm so as to permit the hitch element to swing laterally whereby either the ring or the clevis-type connection extends forwardly depending upon the type of connection desired to be used.

It is a further object of this invention to provide with the above type of hitch element a lock member mounted on the implement rearwardly of the vertical pivot which engages either the clevis or the ring so as to lock the hitch element against lateral swinging thereby maintaining either the ring or the clevis-type connection in a position in which it extends forwardly of the draft arm. The lock element is normally biased into locked position by means of the spring so that unlocking of the element requires only the force to overcome the spring.

Other objects and advantages of the invention will become apparent to those skilled in the art as the nature of the invention is better understood from the following description and as shown in the accompanying drawings.

Fig. 1 is a side view of the rear end of a tractor and the forward end of an implement with portions of the tractor removed for purposes of clarity.

Fig. 2 is a plan view of the hitch connection.

Fig. 3 is a side view of the hitch connection with the hitch element in one position.

Fig. 4 is a side view of the hitch connection with the hitch element in another position.

Fig. 5 is a sectional view taken substantially along the line 5—5 of Fig. 2.

The tractor herein shown is of conventional type having an elongated body 10 carried on front wheels, not shown, and a pair of transversely spaced rear wheels 11, 12 which are mounted on opposite ends of an axle structure 13. The tractor also features a conventional-type of implement connecting means in the form of rigid drawbar 14 extending rearwardly from the tractor and connectible to any type of clevis-type connection. Also featured is a pair of hydraulically operated lift arms, the right lift arm 15 being shown in Fig. 1.

As a first part or portion of the hitch assembly, there is provided a vertically swingable drawbar 16 pivotally mounted at its forward end 17 to the tractor body and having at its rear end a coupler member in the form of a hook 18 for connection to a complementary coupler member or ring on a draft implement. Opposite sides of the vertically swingable drawbar 16 are connected to the lift arms, such as at 15, by a pair of connecting links, one being shown at 19. The lift arms 15 serve as the power means for raising and lowering the drawbar 16.

The implement 30 is shown for illustrative purposes as a conventional-type trailer or wagon having an elongated trailer box 31 supported at both its front and rear by wheel trucks, such as at 32 at its front end, which includes a pair of transversely spaced wheels 33 mounted on opposite ends of an axle 34. Extending forwardly of the axle 34 is a draft arm 40 which is vertically swingable and normally rests upon the ground at its forward end. A stand 41 which may be considered as part of the hitch device is provided at the forward end of the draft arm 40 for purposes of preventing direct contact between the arm 40 and the ground.

As a second portion or part of the hitch assembly there is provided a hitch element 45 positioned adjacent the forward end of the draft arm 40. The element 45 is characterized by having at opposite ends thereof complementary couplings for connection to the tractor couplings. At one end thereof the coupling is in the form of a clevis-type connection 46 and at the opposite end thereof the coupling is in the form of a ring 47. The clevis end 46 and ring end 47 are interconnected by a shank portion 48 which has a vertical aperture 49 which receives a vertically disposed bolt 50. A bushing 51 is provided between the shank of the bolt 50 and the internal surface of the aperture 49 so as to provide structure forming a vertical pivot permitting lateral swinging of the element 45. Provided at the forward end of the draft arm 40 is an aperture 52 for receiving the lower end of the bolt 50. A nut 53 for the bolt 50 is provided at its lower end and serves to hold or lock the element 45 on the forward end of the draft arm 40. As may be seen in the drawings, the stand 41 is also mounted on the bolt 50.

Spaced rearwardly from the bolt 50 is a locking member or pin 55 which extends through a suitable aperture 56 in the draft arm 40. The lower end of the pin 55 is recessed, as at 57, to form a knob by which the pin may be gripped. The aperture 56 is located relative to the bolt 50 or aperture 52 so that the pin when positioned as in Figs. 3 and 4 will sit in the openings, in one position of the element 45, which would normally accommodate the clevis pin, and in the other position of the element 45, adjacent the inner surface of the ring 47. In either position of the element 45 the pin 55 is so located that it will prevent lateral swinging of the element 45.

The pin 55 is also provided with an integral collar 58, which will normally seat itself against the lower surface of the draft arm 40. The pin 55 also extends through a U-shaped bracket support 60 which has a laterally disposed surface 61. The bracket is welded as at 62 to the lower surface of the draft arm 40. Disposed between the collar 58 and the lateral portion 61 is a spring 63 which normally biases the pin 55 to its locked position and the collar 58 into its abutting position with the draft arm 40.

The hitch device operates in the following manner. Assuming first that the ring 47 is in a forwardly extending position relative to the draft arm 40, or more specifically in the manner indicated in Figs. 1, 2, 3, and 5, the ring 47 will be so positioned that the tractor operator may connect the vertical swinging drawbar 16 and more particularly the hook 18 and the ring 47 merely by backing the tractor to a position in which the hook 18 is directly below the ring 47 and operating the lift arms 15 to raise the drawbar 16. The draft arm 40 may then be raised clear of the ground and in a position for transport.

If it is desired to mount the hitch element 45 to a rigid drawbar, such as at 14, the pin 55 is first moved downwardly by hand so that the upper end of the pin is clear of the clevis-type connection 46 at the rear end of the element 45. Once the locking pin 55 is clear, the element 45 may be swung laterally about the pivot or bolt 50 to a position in which the ring 47 is above the pin 55. The pin 55 may then be released to be automatically seated in the opening of the ring 47. The hitch element 45 will then be in a position shown in Fig. 4 in which the clevis-type coupling 46 is forwardly of the draft arm 40. The clevis-type connection may then be moved manually to a position in which it may be connected to the drawbar 14.

It should be recognized that other forms and variations of the present invention will occur to those skilled in the art. It should therefore be understood that while the present form of the invention was disclosed in detail for the purpose of fully and concisely illustrating its principles, it is desired not to so limit or narrow the invention beyond the broad general principles set forth in the appended claims.

What is claimed is:

1. A hitch assembly for a trailing implement operative to selectively connect the implement to various types of tractor drawbars, one type of which may be a drawbar fixed against vertical movement and suitable for a clevis connection and another type of which may be a vertically movable drawbar with a hook thereon, said hitch assembly comprising: an elongated rigid hitch element with a hitch connection at one end in the form of a ring for mounting on a hook of a vertically movable drawbar and a hitch connection at the opposite end in the form of a clevis adapted for mounting on the fixed drawbar; structure defining a pivot for mounting said hitch element proximate the forward end of the implement for permitting swinging of the element on the pivot to selectively position the hitch connections forwardly, said pivot being equally spaced from the opening in the ring and the clevis opening; and a locking pin on the implement rearward of the pivot adapted for contact with the hitch connection rearward of the pivot and effective to prevent swinging of the hitch element about the pivot.

2. The invention defined in claim 1 in which the implement is of the type in which its forward end unless otherwise restricted will rest on the ground, the pivot is in the form of a pivot pin vertically disposed, and the invention is further characterized by a stand mounted on the pivot pin extending downwardly for supporting the forward end of the implement.

References Cited in the file of this patent

UNITED STATES PATENTS

| | | |
|---|---|---|
| 1,887,054 | Wood | Nov. 8, 1932 |
| 2,548,259 | Hall | Apr. 10, 1951 |
| 2,659,610 | Fischer | Nov. 17, 1953 |
| 2,705,444 | McCormick | Apr. 5, 1955 |
| 2,805,083 | Sherwen | Sept. 3, 1957 |
| 2,827,307 | Osborn | Mar. 18, 1958 |

FOREIGN PATENTS

| | | |
|---|---|---|
| 89,343 | Norway | May 27, 1957 |
| 463,395 | Germany | July 27, 1928 |